US012708577B2

(12) United States Patent
Slavin et al.

(10) Patent No.: US 12,708,577 B2
(45) Date of Patent: Aug. 18, 2026

(54) SHEET ASSEMBLIES HAVING A PLURALITY OF ADJUSTABLE STRAPS

(71) Applicant: LIKO RESEARCH & DEVELOPMENT AB, Luleå (SE)

(72) Inventors: Jennifer Domina Slavin, Batesville, IN (US); Michael Buccieri, Greenfield, IN (US); Alejandro Noe Conejo Castaño, Batesville, IN (US); Jonathan D. Turner, Dillsboro, IN (US); Elin Dovervik, Luleå (SE)

(73) Assignee: Liko Research & Development AB, Luleå (SE)

( * ) Notice: Subject to any disclaimer, the term of this patent is extended or adjusted under 35 U.S.C. 154(b) by 221 days.

(21) Appl. No.: 18/428,754

(22) Filed: Jan. 31, 2024

(65) Prior Publication Data

US 2024/0164968 A1 May 23, 2024

Related U.S. Application Data

(63) Continuation of application No. 17/405,456, filed on Aug. 18, 2021, now Pat. No. 11,918,526.

(60) Provisional application No. 63/068,395, filed on Aug. 21, 2020.

(51) Int. Cl.
*A61G 7/10* (2006.01)

(52) U.S. Cl.
CPC .......... *A61G 7/1051* (2013.01); *A61G 7/1026* (2013.01)

(58) Field of Classification Search
CPC .. A61G 7/1051; A61G 7/1026; A61G 7/1074; A61G 7/1055
See application file for complete search history.

(56) References Cited

U.S. PATENT DOCUMENTS

| | | | | |
|---|---|---|---|---|
| 4,723,327 A | 2/1988 | Smith | | |
| 6,341,393 B1 | 1/2002 | Votel | | |
| 6,378,148 B1 | 4/2002 | Votel | | |
| 10,398,614 B2 | 9/2019 | Rigoni et al. | | |
| 2013/0227789 A1* | 9/2013 | Olson | .................. | A61G 7/1026 5/625 |
| 2018/0193213 A1* | 7/2018 | Spahn | ........................ | B32B 5/26 |

* cited by examiner

*Primary Examiner* — Nathan L Van Sell
(74) *Attorney, Agent, or Firm* — Dinsmore & Shohl LLP

(57) ABSTRACT

A sheet assembly includes a sheet having an edge and a pocket extending longitudinally along the edge. A plurality of loops are arranged along the edge and extend from openings formed in the pocket of the sheet. An adjustment webbing is slidably positioned within the pocket. At least a portion of each loop of the plurality of loops is anchored to the adjustment webbing such that sliding the adjustment webbing along the pocket pulls the plurality of loops into the pocket and reduces an exposed length of the plurality of loops.

20 Claims, 8 Drawing Sheets

SHEET ASSEMBLIES HAVING A PLURALITY OF ADJUSTABLE STRAPS

CROSS-REFERENCE TO RELATED APPLICATIONS

The present application is a continuation of U.S. patent application Ser. No. 17/405,456, filed Aug. 18, 2021, which claims the benefit of priority to U.S. Provisional Patent Application No. 63/068,395, filed Aug. 21, 2020, the entireties of which are herein incorporated by reference.

TECHNICAL FIELD

The present specification generally relates to sheet assemblies, and more specifically, sheet assemblies having a plurality of adjustable straps.

BACKGROUND

Sheet assemblies may be used in care facilities to perform a variety of functions. In some cases sheet assemblies, with or without the use of an overhead lift, may be used to turn, transport, and/or otherwise position a subject as needed. To aid in the movement of subjects, such sheet assemblies may include a plurality of straps, which extend beyond an edge of the sheet. When not in use, the plurality of straps may hang over the edge of a subject support surface (e.g., a bed). If the plurality of straps touch the floor, this could lead to contamination of the plurality of straps and/or present a potential trip hazard. Moreover, the plurality of straps, when not in use, may become entangled with objects around the subject support surface (e.g., monitoring equipment, handrails, etc.) and/or with the subject or caregivers.

SUMMARY

In a first aspect A1, a sheet assembly includes a sheet having an edge and a pocket extending longitudinally along the edge. A plurality of loops are arranged along the edge and extend from openings formed in the pocket of the sheet. An adjustment webbing is slidably positioned within the pocket. At least a portion of each loop of the plurality of loops is anchored to the adjustment webbing such that sliding the adjustment webbing along the pocket pulls the plurality of loops into the pocket and reduces an exposed length of the plurality of loops. A second aspect A2 includes the first aspect A1, wherein the adjustment webbing includes a handle positioned outside of the pocket at a pocket opening formed within the pocket. A third aspect includes the second aspect A1, wherein the pocket opening is formed at a position between a first end of the pocket and a second end of the pocket opposite the first end. A fourth aspect includes the second aspect A2 or the third Aspect A3, wherein the pocket opening is formed at one of a first end and a second end of the pocket. A fifth aspect A5 includes any preceding aspect A1-A4, wherein the plurality of loops are formed via a continuous strap at least partially disposed within the pocket, the strap arranged such that portions of the strap extend through the openings to define the plurality of loops. A sixth aspect A6 includes any of aspect A1 through aspect A4, wherein the plurality of loops are formed via a plurality of straps coupled to the sheet within the pocket. A seventh aspect A7 includes any preceding aspect A1-A6, wherein the adjustment webbing includes a plurality of anchor loops, each anchor loop defining an opening through the adjustment webbing, wherein a portion of each loop extends through the opening of the anchor loop. An eighth aspect A8 includes an preceding aspect A1-A7, wherein each loop is coupled to the sheet within the pocket at a first location and a second location.

In a ninth aspect A9, a sheet assembly includes a sheet having an edge and a pocket extending longitudinally along the edge. A strap is arranged within the pocket and defines a plurality of loops extending from the pocket of the sheet, wherein the strap is fixed relative to the pocket at a position between each loop of the strap. An adjustment webbing is slidably positioned within the pocket, wherein at least a portion of each loop of the plurality of loops is anchored to the adjustment webbing such that sliding the adjustment webbing along the pocket pulls the plurality of loops into the pocket and reduces an exposed length of the plurality of loops. A tenth aspect A10 includes the ninth aspect A9, wherein the adjustment webbing includes a handle positioned outside of the pocket at a pocket opening formed within the pocket. An eleventh aspect A11 includes the tenth aspect, wherein the pocket opening is formed at a position between a first end of the pocket and a second end of the pocket opposite the first end. A twelfth aspect A12 includes the tenth aspect A10 or the eleventh aspect A11, wherein the pocket opening is formed at one of a first end and a second end of the pocket. A thirteenth aspect A13 includes any of aspects nine A9 through twelfth, wherein the adjustment webbing includes a plurality of anchor loops, each anchor loop defining an opening through the adjustment webbing, wherein a portion of each loop extends through the opening of the anchor loop.

A fourteenth aspect A14 includes any preceding aspect A1-A13, wherein at least one major surface of the sheet has a lower coefficient of friction than an opposite major surface of the sheet. A fifteenth aspect A15 includes any preceding aspect A1-A14, wherein the pocket defines a plurality of strap openings and a loop of the plurality of loops extend through a strap opening of the plurality of strap openings. A sixteenth aspect A16 includes aspect A15, wherein at a location of each loop of the plurality of loops is a first strap opening and a second strap opening, wherein the loop extends through both the first strap opening and the second strap opening.

In a seventeenth aspect A17, a sheet assembly for positioning a subject includes a sheet having a first edge, a second edge opposite the first edge, a subject support portion spanning between the first edge and the second edge, a first pocket extending longitudinally along the first edge, and a second pocket extending longitudinally along the second edge. A first plurality of loops are arranged along the first edge and extend from the first pocket of the sheet. A first adjustment webbing is slidably positioned within the first pocket, wherein at least a portion of each loop of the first plurality of loops is anchored to the first adjustment webbing such that sliding the first adjustment webbing along the first pocket pulls the first plurality of loops into the first pocket and reduces an exposed length of the first plurality of loops. A second plurality of loops are arranged along the second edge and extend from the second pocket of the sheet. A second adjustment webbing is slidably positioned within the second pocket, wherein at least a portion of each loop of the second plurality of loops is anchored to the second adjustment webbing such that sliding the second adjustment webbing along the second pocket pulls the second plurality of loops into the second pocket and reduces the exposed length of the first plurality of loops. An eighteenth aspect A18 includes the seventeenth aspect A17, wherein each of the first adjustment webbing and the second adjustment webbing include a handle positioned outside of the first pocket and the second pocket respectively. A nineteenth aspect A19 includes the eighteenth aspect A18, wherein each of the first pocket and the second pocket include a pocket opening formed at a position between a first end and a second end opposite the first end of the first pocket and the second pocket. A twentieth aspect A20 includes either the eighteenth aspect A18 or the nineteenth aspect, wherein each of the first pocket and the second pocket include a pocket opening formed at one of a first end and a second end of the first pocket and the second pocket. A twenty-first aspect A21 includes any of the seventeenth aspect A17 through the twentieth aspect A20, wherein each of the first adjustment webbing and the second adjustment webbing include a first handle positioned at one end of the first adjustment webbing and the second adjustment webbing and a second handle positioned at an opposite end of the first adjustment webbing and the second adjustment webbing. A twenty-second aspect A22 includes any of the seventeenth aspect A 17 through the twenty-first aspect A21, wherein the first plurality of loops are formed via a continuous strap coupled to the sheet within the first pocket so as to form the first plurality of loops. A twenty-third aspect A23 includes of the seventeenth aspect A17 through the twenty-second aspect A22, wherein the second plurality of loops are formed via a continuous strap coupled to the sheet within the second pocket so as to form the second plurality of loops. A twenty-fourth aspect A24 includes any of the seventeenth aspect through the twenty-third aspect, wherein the first adjustment webbing and the second adjustment webbing includes a plurality of anchor loops, each anchor loop defining an opening through the first adjustment webbing and the second adjustment webbing, wherein a portion of each loop extends through the opening of the anchor loop. A twenty-fifth aspect A25 includes any of the seventeenth aspect A17 through the twenty-fourth aspect A24, wherein at least one major surface of the sheet has a lower coefficient of friction than an opposite major surface of the sheet. A twenty-sixth aspect A26 includes any of the seventeenth aspect A17 through the twenty-fifth aspect A25, wherein each of the first pocket and the second pocket define a plurality of strap openings and a loop of each of the first plurality of loops and the second plurality of loops extend through a strap opening of the plurality of strap openings. A twenty-seventh aspect A27 includes the twenty-sixth aspect A26, wherein at a location of each loop of the first plurality of loops and the second plurality of loops is a first strap opening and a second strap opening, wherein the loop extends through both the first strap opening and the second strap opening.

In a twenty-eighth aspect A28, a method of adjusting the sheet assembly of any of the first aspect A1 through sixteenth aspect A16 includes pulling the adjustment webbing along pocket, thereby causing the plurality of loops to move from an extended position to a retracted position. A twenty-ninth aspect A29 includes aspect twenty-eight A28, further including pulling on a loop of the plurality of loops, thereby causing the loop of the plurality of loops to move from the retracted position to the extended position. A thirtieth aspect A30 includes either of aspect twenty-eight A28 or aspect twenty-nine A29, wherein pulling on the adjustment webbing, includes pulling a handle coupled to the adjustment webbing.

In a thirty-first aspect A31, a method of assembling the sheet assembly any of the first aspect A1 through sixteenth aspect A16 includes forming the pocket along the edge of the sheet, coupling the plurality of loops to the sheet within the pocket, and anchoring a portion of the each of the loops to the adjustment webbing.

In a thirty-second aspect A32, a method of adjusting the sheet assembly of any of the seventeenth aspect A17 through the twenty-seventh aspect A27 includes pulling at least one of the first adjustment webbing and the second adjustment webbing, thereby causing at least one of the first plurality of loops and the second plurality of loops to move from an extended position to a retracted position. A thirty-third aspect A33 includes the thirty-first aspect A31, further including pulling on a loop of one of the first plurality of loops and the second plurality of loops, thereby causing the loop of the first plurality of loops or the second plurality of loops to move from the retracted position to the extended position. A thirty-fourth aspect includes any of the thirty-first aspect A31 through the thirty-third aspect A33, wherein pulling on the at least one of the first adjustment webbing and the second adjustment webbing, comprises pulling a handle coupled to one of the first adjustment webbing and the second adjustment webbing.

In a thirty-fifth aspect A35, a method of assembling the sheet assembly of any of the seventeenth aspect through the twenty-seventh aspect includes forming the first pocket along the first edge of the sheet, coupling the first plurality of loops to the sheet within the first pocket, anchoring a portion of the each loops of the first plurality of loops to the first adjustment webbing, forming a second pocket along the second edge of the sheet, coupling the second plurality of loops to the sheet within the second pocket, and anchoring a portion of the each loop of the second plurality of loops to the second adjustment webbing.

In a thirty-sixth aspect A36, a kit includes the sheet assembly of any preceding, and instructions for adjusting the sheet assembly. A thirty-seventh aspect A37 includes the thirty-sixth aspect, wherein the instructions are printed or embroidered onto the sheet assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to sheet assemblies that include a sheet and a plurality of loops coupled to the sheet that are moveable between an extended position and a retracted position. For example, a sheet assembly includes a sheet that includes a pocket extending longitudinally along an edge of the sheet. A plurality of loops are arranged along the edge and extend from strap openings in the pocket of the repositioning sheet. An adjustment webbing is slidably positioned within the pocket. A least a portion of each loop of the plurality of loops is anchored to the adjustment webbing such that sliding of the adjustment webbing along the pocket reduces an exposed length of the plurality of loops outside the pocket. That is, the plurality of loops may be retracted into the pocket of the sheet, thereby shortening an exposed length of the plurality of loops. This may prevent the loops from becoming a trip hazard or becoming entangled with people or objects surrounding a subject support surface when not in use. Various embodiments of the sheet assembly and methods of use and/or methods of assembling a sheet assembly will be described in more detail herein.

Figure 1A:
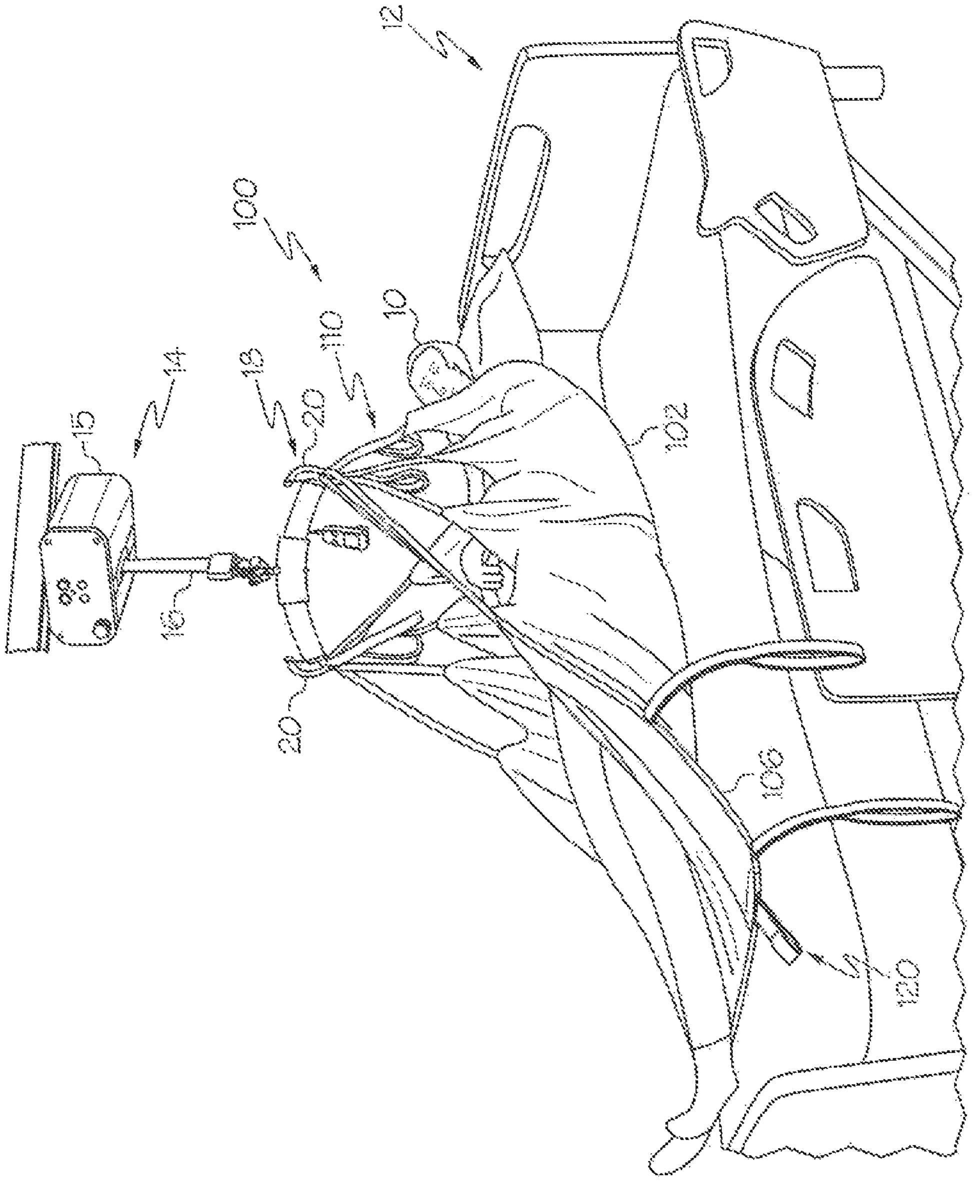
FIG. 1A depicts an illustrative sheet assembly for positioning a subject, according to one or more embodiments shown and described herein.
Figure 1B:
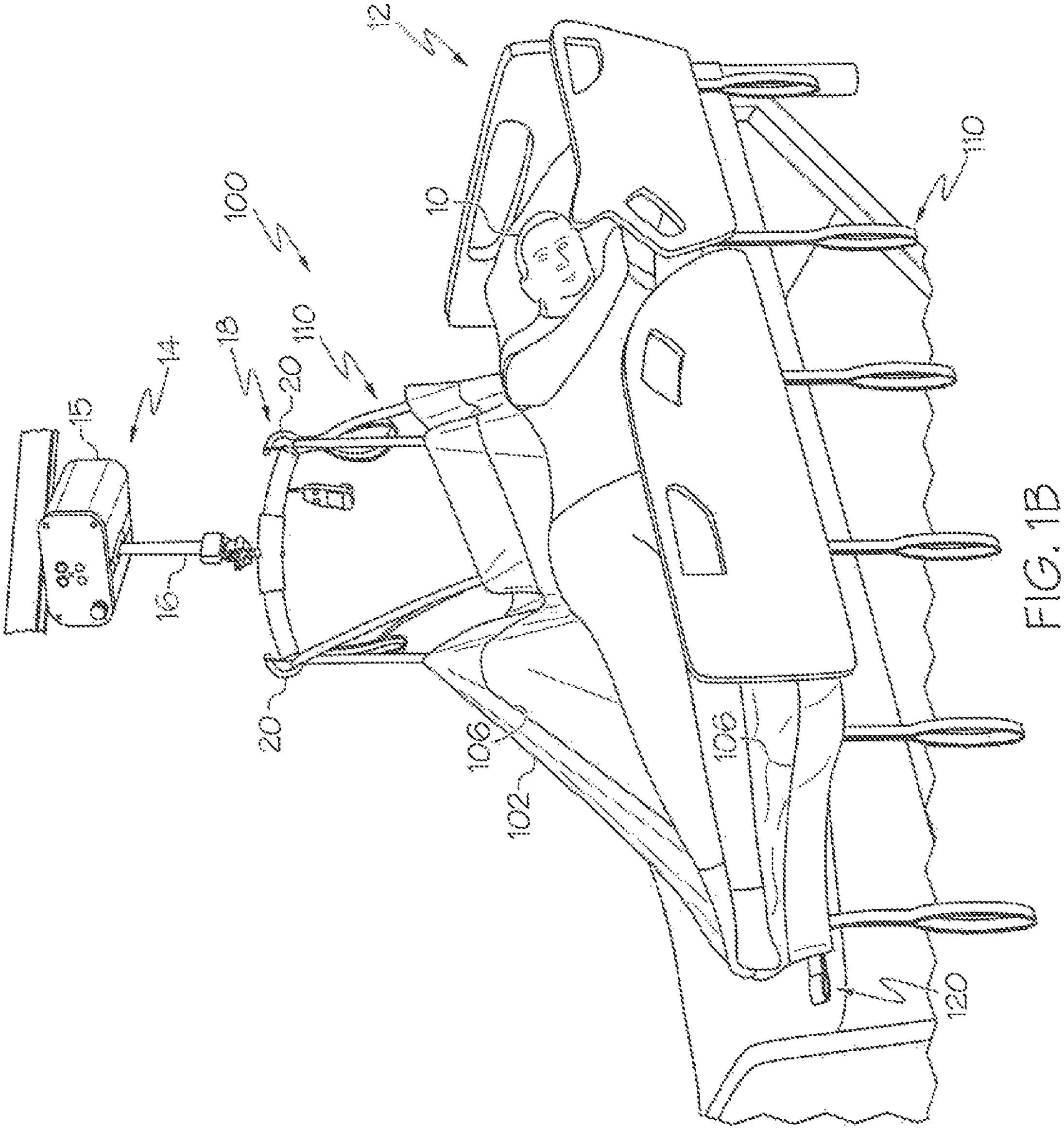
FIG. 1B depicts the sheet assembly of FIG. 1A arranged to position a subject to a side laying position, according to one or more embodiments shown and described herein.

Referring now to FIGS. 1A and 1B, a sheet assembly 100 is illustrated, which may be used to reposition, lift, move, rotate, or the like a subject 10 positioned on a support surface 12 (for example, a bed, table, or the like). In some embodiments, the sheet assembly 100 may be used to transport a subject 10 between a first location and a second location. The sheet assembly 100 may generally include a sheet 102, a plurality of loops 110, and one or more adjustment webbings 120. The subject 10 may be positioned on the sheet 102 and the plurality of loops 110 may be pulled to position the subject 10 as desired. For example, the plurality of loops 110 may be affixed to the sheet 102 in such a manner that when a force (e.g., a pulling force) is applied to the plurality of loops 110, or a portion thereof, the force is transferred to the sheet 102, thereby moving the subject 10 positioned on the sheet 102. In some embodiments, the pulling or lifting force may be applied via a lift system 14. For example, the plurality of loops 110 may be coupled to a lift system 14 or may be manually manipulated to reposition the subject 10.

For example, and as illustrated in FIGS. 1A and 1B, a lift system 14 may include a motorized lift unit 15 operable to pay out or take up a lift strap 16. Coupled to the lift strap 16 may be a sling bar 18. The sling bar 18 may include one or more hooks 20 to which the plurality of loops 110 may be attached (for example, positioned over). As illustrated in FIG. 1A, loops 110 arranged along opposite edges of the sheet 102 may be coupled to opposite hooks 20. In such embodiments, the motorized lift unit 15 may lift the subject 10 positioned with the sheet 102. Referring now to FIG. 1B, loops 110 arranged along one edge of the sheet 102 may be coupled to the one or more hooks 20 of the sling bar 18. In such embodiments, when the motorized lift unit 15 takes up the lift strap 16, the subject 10 may be turned to their side.

Figure 2A:
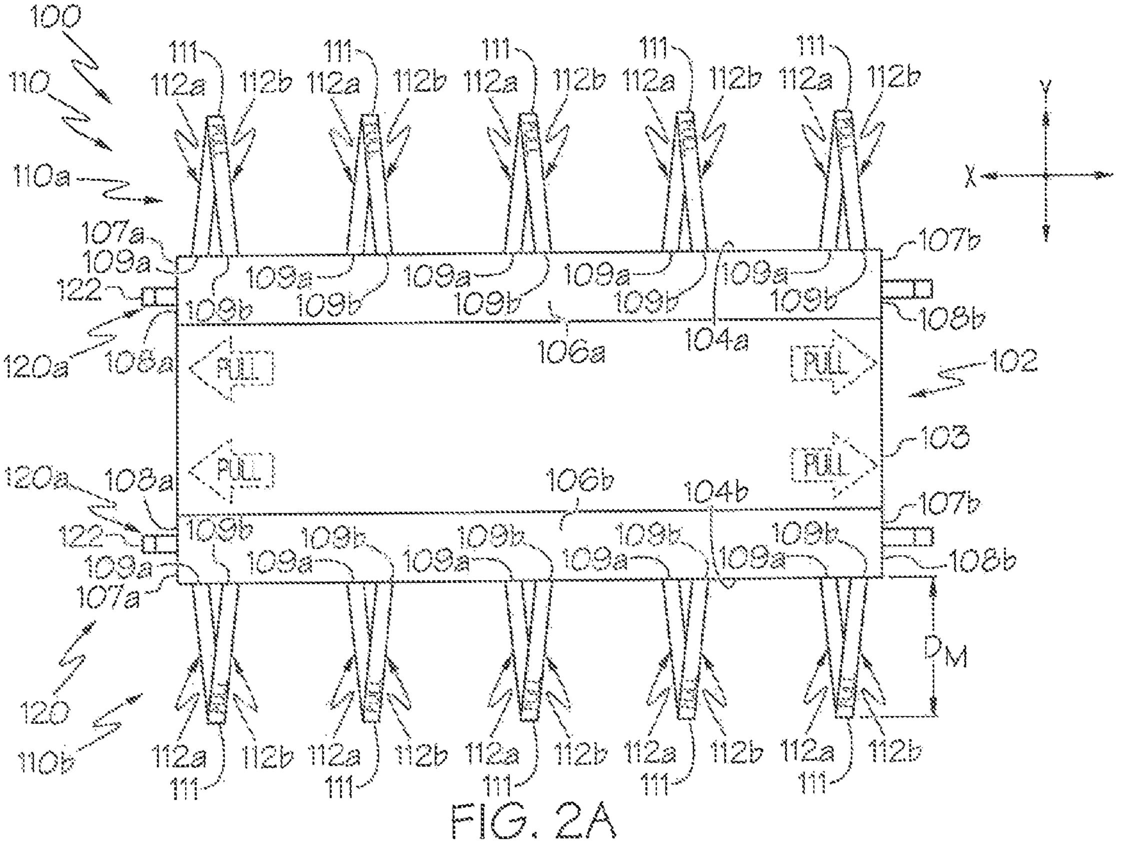
FIG. 2A depicts a top view of an illustrative sheet assembly having a sheet and a plurality of loops, according to one or more embodiments shown and described herein.
Figure 2B:
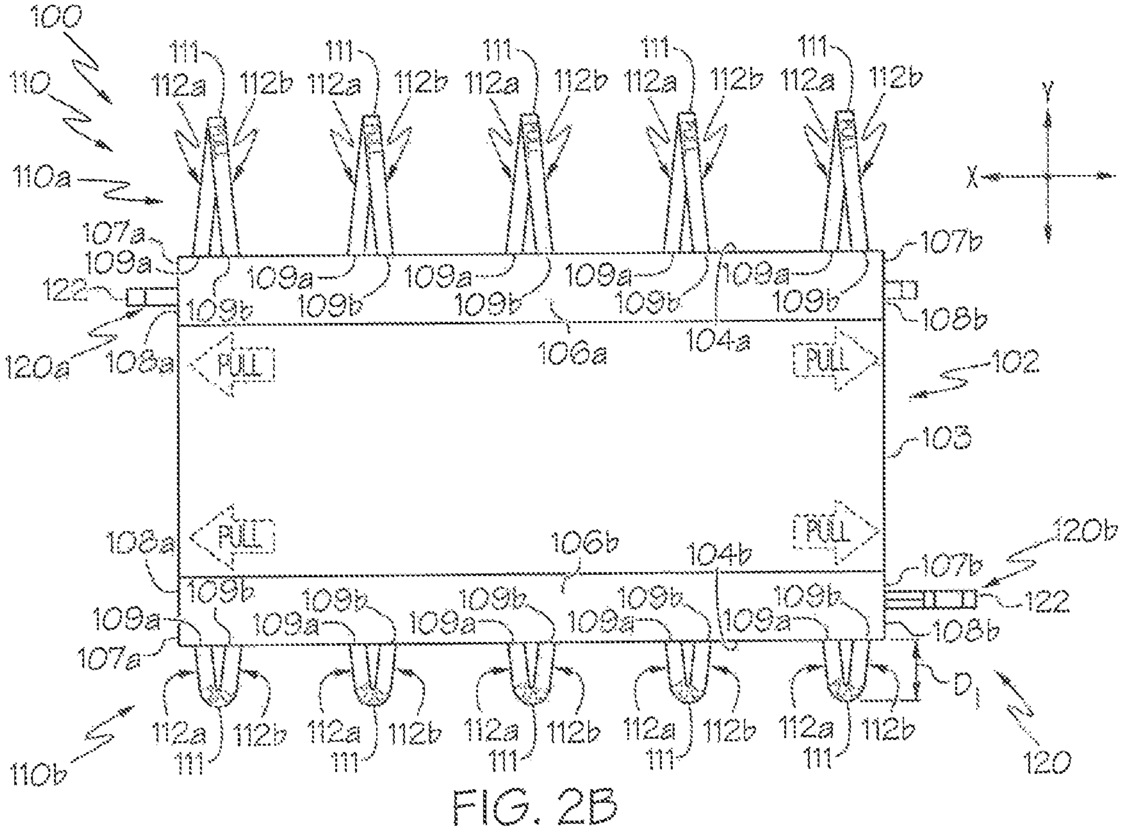
FIG. 2B depicts a top view of the sheet assembly of FIG. 2A with a portion of the plurality of loops moved to a retracted position within a pocket of the sheet assembly, according to one or more embodiments shown and described herein.

Referring now to FIG. 2A, a top view of a sheet assembly 100 is depicted. As noted above, the sheet assembly 100 generally includes a sheet 102 and a plurality of loops 110 that are retractable and extendable into and out of the sheet 102. Also included is an adjustment webbing 120 configured to facilitate adjustment of the plurality of loops 110. For example, FIG. 2A illustrates the plurality of loops 110*b* in an extended position. Referring now to FIG. 2B movement of the adjustment webbing 120*b*, as illustrated in FIG. 2B, causes the plurality of loops 110*b* to be withdrawn to a retracted position. Such will be described in greater detail herein.

The sheet 102 may generally be provided by a flat sheet of material or layers of material that includes a first edge 104*a* and a second edge 104*b* opposite the first edge 104*a*. A subject support portion 103 spans a distance between the first edge 104*a* and the second edge 104*b*. In use, a subject 10 may be positioned on or within the subject support portion 103.

One or more pockets may be formed within the sheet 102. For example, a first pocket 106*a* may extend longitudinally along the first edge 104*a* and/or a second pocket 106*b* may extend longitudinally along the second edge 104*b*. The first and/or second pockets 106*a*, 106*b* may each define a passage through which the adjustment webbing 120 slides (e.g., in a longitudinal direction along the +/−X axis of the depicted coordinate axes) to move the plurality of loops 110, anchored to the adjustment webbing 120, from the extended position to the retracted position. The "extended position" refers to the plurality of loops 110, or a portion thereof, extending a maximum distance, $D_M$, from the first pocket 106*a* or the second pocket 106*b*, such as illustrated in FIG. 2A. The "retracted position" refers to a position, wherein the plurality of loops 110, or a portion thereof, are withdrawn into the first pocket 106*a* or the second pocket 106*b*, such that the plurality of loops 110, or a portion thereof, extend a shorter distance, Di, from the first pocket 106*a* or the second pocket 106*b*. For example, FIG. 2B illustrates, the second plurality of loops 110*b* retracted to a retracted position.

The first and second pockets 106*a*, 106*b* may be formed in a variety of ways. For example, the first and second pockets 106*a*, 106*b* may be formed by folding the sheet 102 over top of itself along the first edge 104*a* and/or the second edge 104*b*. The folded material may then be stitched, welded, or otherwise fixed in place to provide the first and/or second pockets 106*a*, 106*b*. In some embodiments, a second layer of material may instead be added and sewn, or welded, or otherwise affixed to the sheet 102 to form the first and/or second pockets 106*a*, 106*b*. Though only illustrated as extending along the first edge 104*a* and the second edge 104*b* in FIGS. 2A and 2B, pockets may be formed along any edge of the sheet 102.

Still referring to FIGS. 2A-2B, in embodiments, each pocket 106*a*, 106*b* may define a first end 107*a* and a second end 107*b*. The first and second ends 107*a*, 107*b* of the pockets 106*a*, 106*b* may be positioned at either end of the sheet 102, or proximate thereto. One or more pocket openings may be formed within the pocket 106*a*, 106*b*. The one or more pocket openings may include, for example, a first pocket opening 108*a* formed at the first end 107*a* of the pocket 106*a*, 106*b* and a second pocket opening 108*b* formed at a second end 107*b* of the pocket 106*a*, 106*b*. In some embodiments, there may only be a pocket opening formed at one of the first end 107*a* and the second end 107*b*. In some embodiments, and as will be described in further embodiments, one or more pocket openings may be formed within the pocket 106*a*, 106*b* at a position between the first end 107*a* and the second end 107*b* of the pocket 106*a*, 106*b*. In embodiments, the one or more pocket openings, may be reinforced (e.g., via stitching, coatings, or the like) such that they are able to withstand forces applied to the sheet assembly 100 which may be caused by lifting, repositioning, and/or turning a subject 10.

Figure 3:
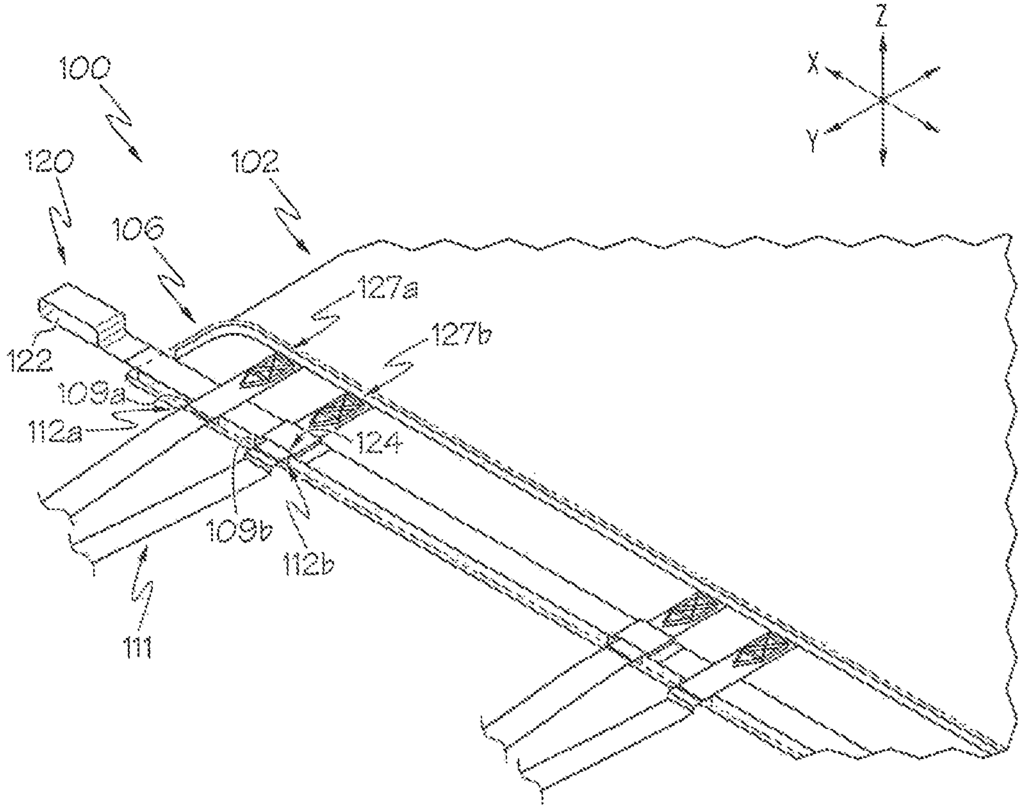
FIG. 3 depicts a perspective view of an interior of a pocket of an illustrative a sheet assembly, according to one or more embodiments shown and described herein.

In embodiments, the pocket(s) 106*a*, 106*b* may further define a plurality of strap openings through which a loop 111 of the plurality of loops 110 extends. For example, at a position of each loop 111 may be a first strap opening 109*a* through which a first portion 112*a* of the loop 111 extends and a second strap opening 109*b* through which the second portion 112*b* of the loop 111 extends. Referring briefly to FIG. 3, each strap opening 109*a*, 109*b* may be separate and distinct from one another to inhibit tangling of the first and second portions 112*a*, 112*b* of the loop 111 and to also prevent the loop 111 from being arranged entirely within the pocket 106 when pulled to the retracted position. That is, the strap openings 109*a*, 109*b* may be separated from one another via stitching, welding, an expanse of fabric, or the like. A portion of the loop 111 may slide into and/or out of the strap opening 109 and/or 109*b* when moving between the retracted and extended positions. In embodiments, the first strap opening 109*a*, the second strap opening 109*b*, may be reinforced (e.g., via stitching, coatings, or the like) such that they are able to withstand forces applied to the sheet assembly 100 which may be caused by lifting, repositioning, and/or turning a subject 10.

Referring generally to FIGS. 2A-2D, the sheet 102, including the pockets 106*a*, 106*b*, may be made from any material or combination of materials including natural and/or synthetic fibers woven and/or bonded into a sheet of material. In some embodiments, the material may be subject to disinfection and/or sterilization treatments, accordingly, the material may be resistant to breakdown which may otherwise be caused by disinfection and/or sterilization treatments. In some embodiments, the material may have or may be treated to have anti-microbial characteristics. In some embodiments, the sheet 102 may be constructed of a material that has load bearing properties allowing the sheet 102 to support the weight of a human subject. In some embodiments, the sheet 102 may be formed from a textile comprising natural fibers that are derived from animal (protein), vegetable (cellulose), and/or mineral sources.

Illustrative examples of natural fibers include, but are not limited to, cellulose (staple) fibers such as bast, leaf, seed hair, cane, grass, and reed; protein (staple) fibers such as hair, wool, and/or filaments (e.g., secretions such as silk); and mineral fibers such as asbestos, glass, gold, silver, and/or the like. In some embodiments, the sheet may be formed from one or more manufactured fibers such as manmade (humanmade), regenerated, or synthetic fibers having a chemical composition that is organic or inorganic or derivatives thereof. In some embodiments the sheet 102 may be formed from one or more fibers having a chemical composition that is organic or inorganic. Illustrative examples of organic polymer fibers from natural sources include, but are not limited to, acetate, alginate, cupro, elastodiene, lyocell, model, triacetate, and viscose. Illustrative examples of organic fibers made from synthetic polymers include, but are not limited to, acrylic, aramid, chlorofibre, elastane, elastodiene, elastoelfin, elastomultiester, flurofiber, melamine, modacrylic, polyamide, polyester, polyethelene, polyimide, polylactic acid, polypropylene, polypropylene/polyamide biocomponent, and vinylal. Illustrative examples of inorganic fibers include, but are not limited to, carbon, ceramic, glass, and metal. In some embodiments, coatings, such as antimicrobial coatings, may be applied to the sheet 102. In some embodiments, at least one major surface of the sheet 102 may be formed of or coated with a low friction material to allow for easier positioning of the sheet 102 under a subject 10. In some embodiments, at least one major surface of the sheet 102 may have a lower coefficient of friction than an opposite major surface of the sheet 102.

Referring again to FIGS. 2A-2D, the plurality of loops 110 may be arranged along one or more edges of the sheet 102. For example, a first plurality of loops 110*a* may be arranged along the first edge 104*a* so as to extend from the first pocket 106*a*, for example, through the strap openings 109*a*, 109*b* of the first pocket 106*a*. In embodiments, a second plurality of loops 110*b* may arranged along the second edge 104*b* so as to extend from the second pocket 106*b*, for example, through the strap openings 109*a*, 109*b* of the second pocket 106*b*. However, it is noted that the plurality of loops 110 may be arranged along any edge of the sheet 102.

Furthermore, it is noted that though the various embodiments depicted in FIGS. 2A-2D illustrate a particular number of loops 111, there may be any number of loops or loops 111 within each plurality of loops 110*a*, 110*b*, such as 1 or more, 2 or more, 4 or more, 6 or more, or the like without departing from the scope of the present application.

Figure 2C:
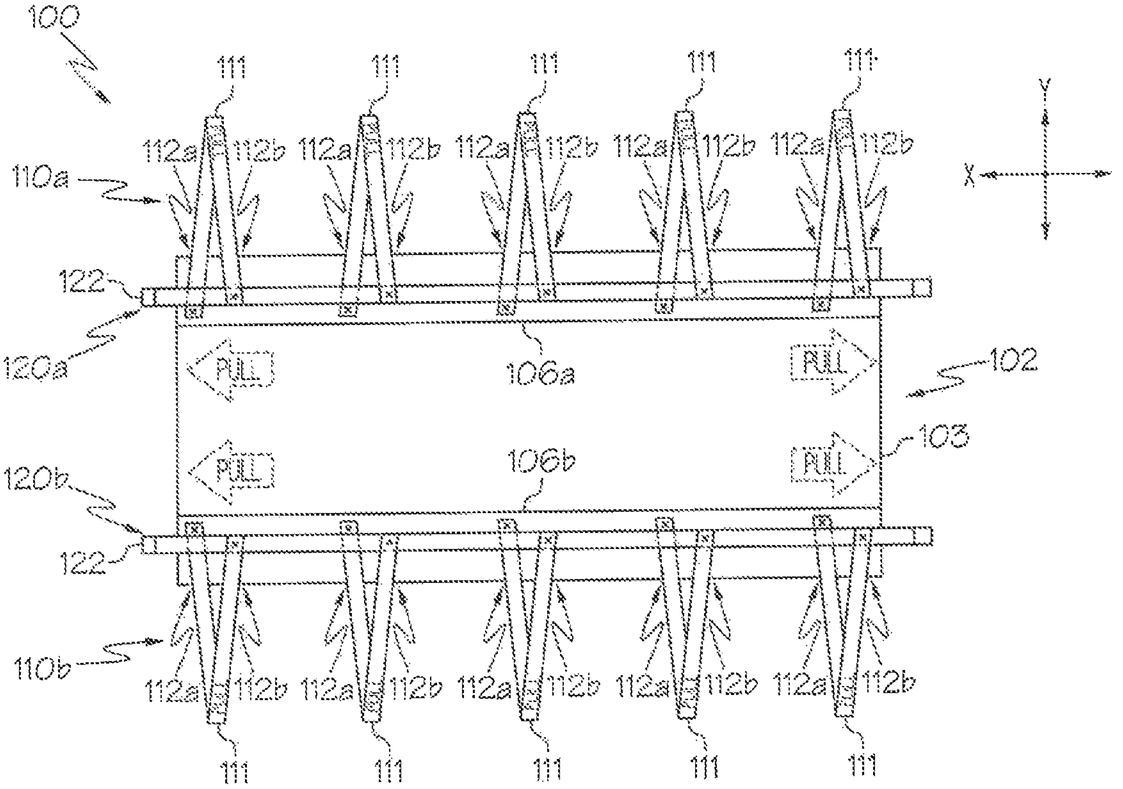
FIG. 2C depicts a top view of the sheet assembly of FIG. 2A with the interior of the pockets of the sheet assembly exposed, according to one or more embodiments shown and described herein.
Figure 2D:
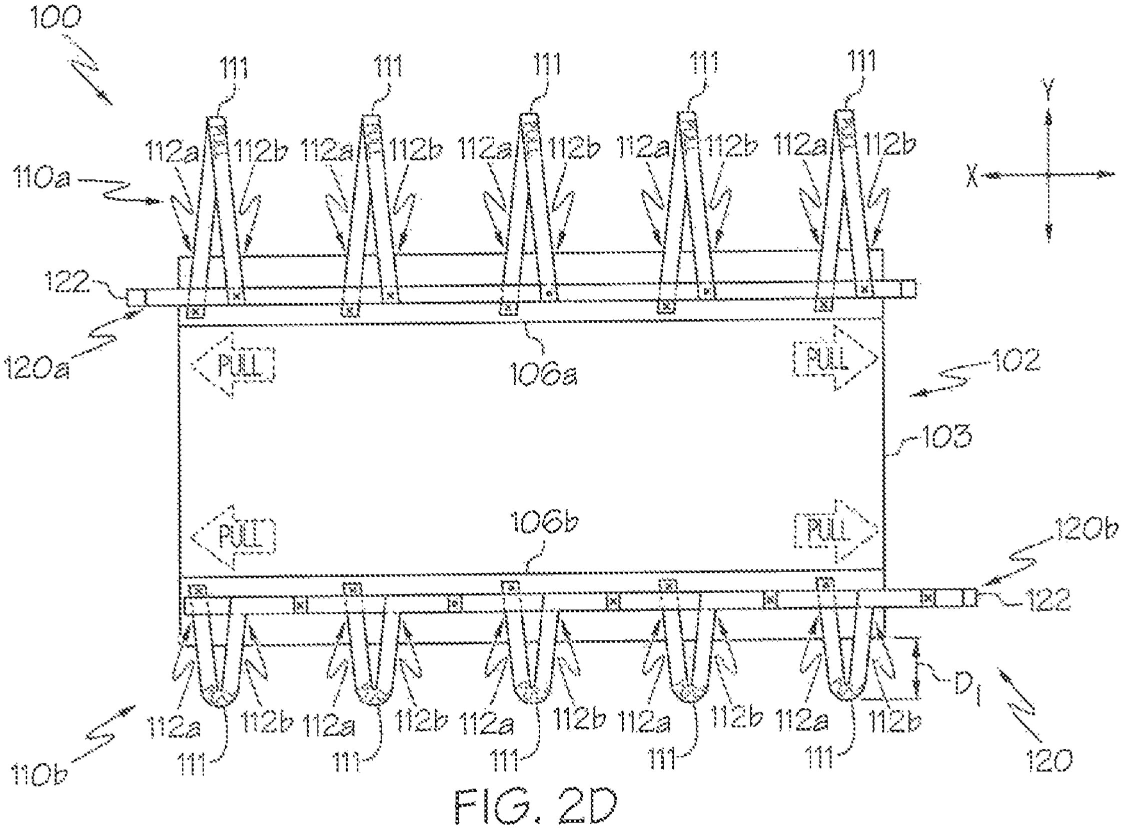
FIG. 2D depicts the repositioning sheet of FIG. 2A with the interior of the pockets of the sheet assembly exposed and the plurality of loops moved to the retracted position as illustrated in FIG. 2B, according to one or more embodiments shown and described herein.

FIGS. 2C and 2D illustrate the top view of the sheet 102 of FIGS. 2A and 2C with a top layer of the first pocket 106*a* and the second pocket 106*b* removed so that an interior of the pockets 106*a*, 106*b* are visible. In the illustrated embodiment, each loop 111 of the first plurality of loops 110*a* and the second plurality of loops 110*b* may be discrete from one another such that they are formed of separate lengths of strap material. As noted above, each loop 111 may include a first portion 112*a* and a second portion 112*b* that extends through a first strap opening 109*a* and a second opening, respectively, formed in the pocket 106*a* and/or 106*b*. At least one of the first portion 112*a* and the second portion 112*b* may be coupled to the sheet 102 within the pocket 106*a*, 106*b* (for example, via stitching, adhesive, welding, or the like). For example, and as illustrated in FIGS. 2C and 2D, the second portion 112*b* may be coupled to the sheet 102 within the pocket 106*a*, 106*b* while the first portion 112*a* is coupled to the adjustment webbing 120*a*, 120*b* (for example, via stitching, adhesive, welding, and/or the like).

Referring now to FIG. 3, a perspective view of an embodiment of an interior of a pocket 106 is schematically depicted. In the indicated embodiment, a loop 111 extends through strap openings 109*a*, 109*b*. Both of the first portion 112*a* of the loop 111 and the second portion 112*b* of the loop 111 are anchored (for example, via stitching, adhesive, welding, and/or the like) to the sheet 102 within the pocket 106 at a first location 127*a* and a second location 127*b*, respectively. However, in some embodiments, it is contemplated that both the first portion 112*a* and the second portion 112*b* may be anchored to the sheet 102 at the same location.

In embodiment depicted in FIG. 3, the first portion 112*a* is illustrated as extending past the adjustment webbing 120 without passing through the adjustment webbing 120, while the second portion 112*b* is illustrated as extending through the adjustment webbing 120 (for example through an anchor loop 124 formed within the adjustment webbing 120), which acts to anchor the second portion 112*b* of the loop 111 to the adjustment webbing 120. It is noted that either the first portion 112*a* of the loop 111 or the second portion 112*b* of the loop 111 may be anchored to the adjustment webbing 120 without departing from the scope of the present disclosure. Furthermore, not every loop 111 need be anchored to the adjustment webbing 120 in the same manner. For example, for one loop the first portion 112*a* of the loop may be anchored to the adjustment webbing 120 while a second portion 112*b* of another loop may be anchored to the adjustment webbing 120. In some embodiments, the portion of the loop 111 farthest from the first pocket opening 108*a* or the second pocket opening 108*b* may be anchored to the adjustment webbing 120, which may inhibit the loop 111 from being pulled out of the pocket openings 108*a*, 108*b* formed at either end of the pocket 106. For example, by anchoring the loop 111 farthest from the first pocket opening 108*a* or the second pocket opening 108*b* a distance the adjustment webbing may be pulled through a pocket opening 108*a*, 108*b* prior to pulling the loop 111 through the pocket opening may be increased.

Figure 4:
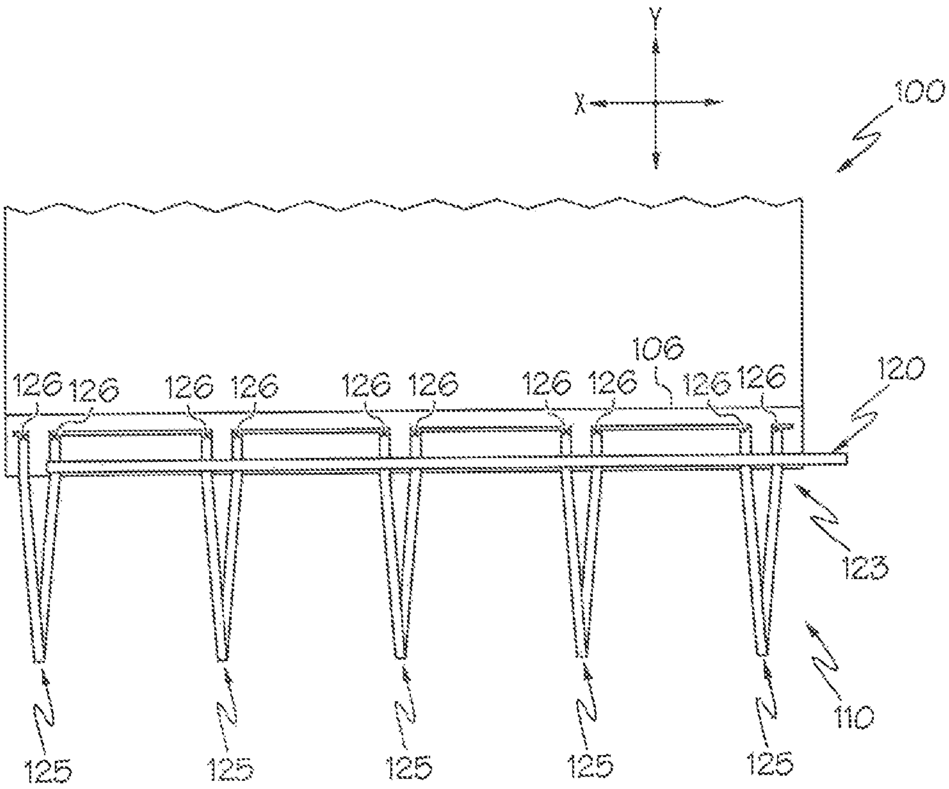
FIG. 4 depicts another illustrative sheet assembly having a plurality of loops formed by a continuous strap, according to one or more embodiments shown and described herein.

Though each loop 111 illustrated in the above embodiments is separate and distinct from one another, in some embodiments, each loop 111 may be formed from a single continuous strap. For example, and with reference to FIG. 4, in some embodiments, the plurality of loops 110 (for example, within the first plurality of loops 110*a*, the second plurality of loops 110*b*, or both) may be formed of a single length of strap material, to form a plurality of loops (for example, a first plurality of loops, a second plurality of loops, or both) extending from the pocket 106 (for example pocket 106*a* and/or 106*b*) of the sheet 102. For example, the strap 123 may be arranged to extend into and out of the pocket 106, at a plurality of positions 125 to define the plurality of loops 110. The strap 123 may be fixed relative to the sheet 102 within the pocket 106 at one or more positions 126 between each looped portion of the strap 123, for example, via stitching, adhesive, welding and/or the like. A portion of each loop may be also anchored to the adjustment webbing 120 such as described in the above-embodiments. In some embodiments, both the first plurality of loops 110*a* and the second plurality of loops 110*b* may be formed from the same continuous strap of material. In such embodiments, the strap 123 may extend along a side edge of the sheet 102 to be positioned within each pocket 106 (for example, pocket 106 and/or 106*b*).

The plurality of loops 110 may be formed of any material and may be formed of the same or a different material from the plurality of the sheet 102 and/or the adjustment webbing 120. For example, the plurality of loops 110 may be formed of any material or combination of materials including natural and/or synthetic fibers woven and/or bonded into a length of material. In some embodiments, the material may be subject to disinfection and/or sterilization treatments, accordingly, the material may be resistant to breakdown which may otherwise be cause by disinfection and/or sterilization treatments. In some embodiments, the material may have or may be treated to have anti-microbial characteristics. In some embodiments, the plurality of loops 110 may be constructed of a material that has load bearing properties allowing the plurality of loops 100 to support the weight of a human subject. In some embodiments, the plurality of loops 110 may be formed from a textile comprising natural fibers that are derived from animal (protein), vegetable (cellulose), and/or mineral sources. Illustrative examples of natural fibers include, but are not limited to, cellulose (staple) fibers such as bast, leaf, seed hair, cane, grass, and reed; protein (staple) fibers such as hair, wool, and/or filaments (e.g., secretions such as silk); and mineral fibers such as asbestos, glass, gold, silver, and/or the like. In some embodiments, the plurality of loops 110 may be formed from one or more manufactured fibers such as manmade (human-made), regenerated, or synthetic fibers having a chemical composition that is organic or inorganic or derivatives thereof. In some embodiments the plurality of loops 110 may be formed from one or more fibers having a chemical composition that is organic or inorganic. Illustrative examples of organic polymer fibers from natural sources include, but are not limited to, acetate, alginate, cupro, elastodiene, lyocell, model, triacetate, and viscose. Illustrative examples of organic fibers made from synthetic polymers include, but are not limited to, acrylic, aramid, chlorofibre, elastane, elastodiene, elastoelfin, elastomultiester, flurofiber, melamine, modacrylic, polyamide, polyester, polyethelene, polyimide, polylactic acid, polypropylene, polypropylene/polyamide biocomponent, and vinylal. Illustrative examples of inorganic fibers include, but are not limited to, carbon, ceramic, glass, and metal. In some embodiments, coatings, such as antimicrobial coatings, may be applied to the plurality of loops 110.

Referring again to FIGS. 2A-2D, and as noted above, the adjustment webbing 120 is configured to move a portion of the plurality of loops 110 from the extended position to the retracted position. For example, the sheet assembly 100 may include a first adjustment webbing 120*a* slidably positioned within the first pocket 106*a* and a second adjustment webbing 120*b* positioned within the second pocket 106*b*. However, it is noted that a fewer or greater number of adjustment webbings may be included without departing from the scope of the present disclosure.

The first adjustment webbing 120*a* may be anchored to one of the first portion 112*a* or the second portion 112*b* of each loop 111 of the first plurality of loops 110*a* such that sliding the first adjustment webbing 120*a* causes the first plurality of loops 110*a* to move from the extended position to the retracted position, thereby reducing an exposed length of the first plurality of loops 110. Similarly, the second adjustment webbing 120*b* may be anchored to one of the first portion 112*a* and the second portion 112*b* of each loop 111 of the second plurality of loops 110*b* such that sliding the second adjustment webbing 120*b* causes the second plurality of loops 110*b* to move from the extended position to the retracted position, thereby reducing an exposed length of the second plurality of loops 110. As noted above, in various embodiments, the loop 111 may be anchored to the adjustment webbing 120 via stitching, adhesive, welding, or the like.

Still referring to FIGS. 2A-2D, to assist a user in sliding the first adjustment webbing 120*a* and the second adjustment webbing 120*b*, each of the first adjustment webbing 120*a* and the second adjustment webbing 120*b* may include a handle 122 positioned outside of the first pocket 106*a* or the second pocket 106*b* at a pocket opening 108*a*, 108*b* formed within the first and second pockets 106*a*, 106*b*. A handle may include any structure or device which allows a user to interact with the adjustment webbing 120*a*, 120*b*, to pull the adjustment webbing 120*a*, 120, thereby causing the adjustment webbing 120*a*, 120*b* to slide within the pocket 106*a*, 106*b*. In some embodiments, the first adjustment webbing 120*a* and the second adjustment webbing 120*b* may include two handles including a first handle positioned at a first end of the first adjustment webbing 120*a* and the second adjustment webbing 120*b* and a second handle positioned at a second end or opposite end of the first adjustment webbing 120*a* and the second adjustment webbing 120*b* to allow a user to slide the adjustment webbing 120 from either end. The handle 122 may be of the same of different material of the adjustment webbing 120*a*, 120*b*. For example, the handle 122 may be made from a loop formed of the adjustment webbing 120*a*, 120*b*. In some embodiments, the handle 122 may be rigid and formed of a polymer, metal, ceramic, glass, or the like. The handle may be bonded or coupled to the adjustment webbing 120*a*, 120*b* via ties, welding, laminating, sewing, or the like.

Figure 5A:
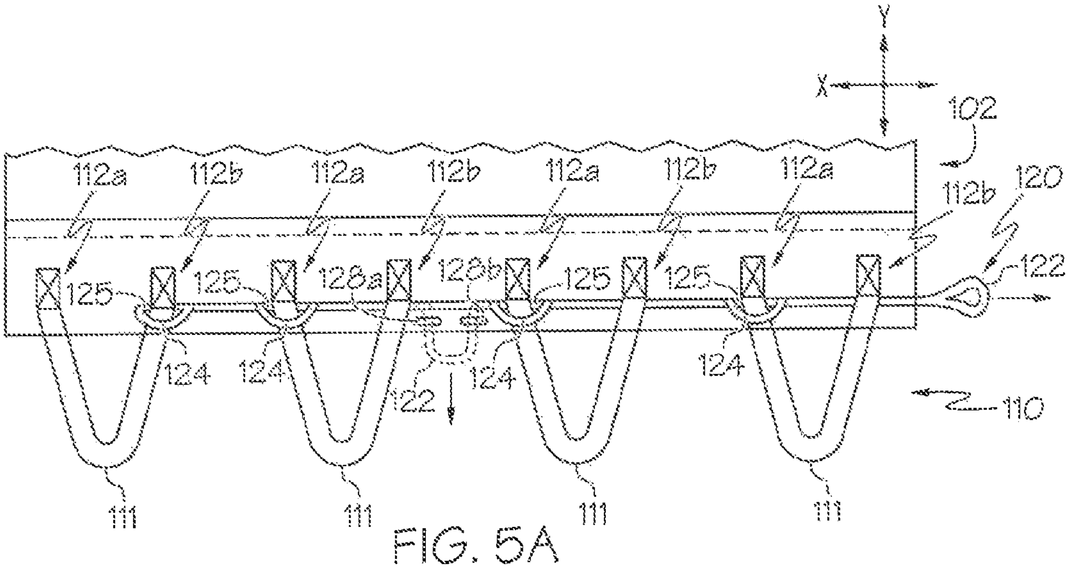
FIG. 5A depicts yet another illustrative sheet assembly having a first portion and a second portion of each loop that are anchored to the sheet of the sheet assembly, according to one or more embodiments shown and described herein.

As illustrated in FIG. 5A, in some embodiments, and as noted above, a pocket opening may be formed at a position between a first end 107*a* and a second end 107*b* of the pocket 106, such that the adjustment webbing 120 is engageable by a user along the edge of the sheet 102. For example, in such embodiments, a first middle pocket opening 128*a* and a second middle pocket opening 128*b* may be formed adjacent to one another along the edge (for example the first edge 104*a* and/or the second edge 104*b*) of the sheet 102. The adjustment webbing 120 may be woven through the first middle opening 128*a* and the second middle opening 128*b*, thereby providing a handle 122, such that a portion of the adjustment webbing 120 is accessible external to the pocket 106 at a position between the first end 107*a* and the second end 107*b* and graspable by a user.

Figure 5B:
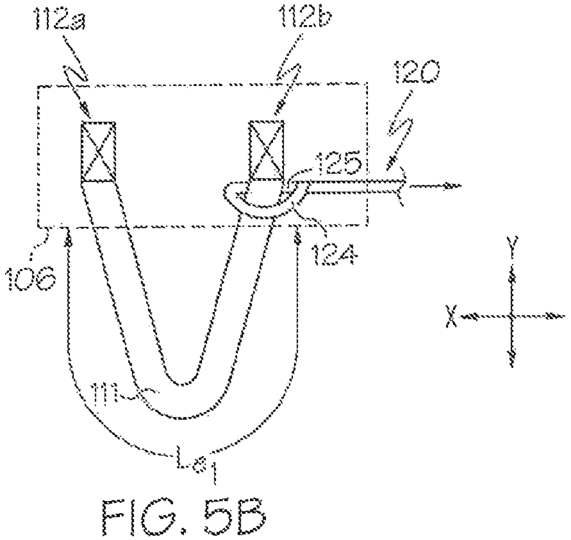
FIG. 5B illustrates a loop of the sheet assembly of FIG. 5A in an extended position, according to one or more embodiments shown and described herein.
Figure 5C:
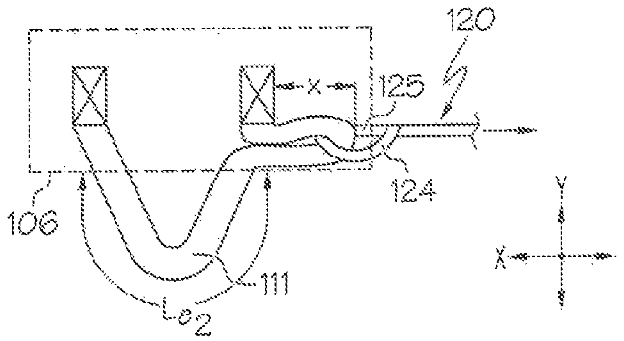
FIG. 5C illustrates the loop of FIG. 5B moved to a retracted position, according to one or more embodiments shown and described herein.

In the embodiments described above, the adjustment webbing 120 may be anchored to the plurality of loops 110 via welding, stitching, adhesive, or the like. With reference now to FIG. 5A, the adjustment webbing 120 may define a plurality of anchor loops 124, each anchor loop 124 defining an opening 125 through the adjustment webbing 120. One of the first portion 112*a* and the second portion 112*b* of each loop 111 may extend through an opening 125 of an anchor loop 124. In such embodiments, both the first portion 112*a* and the second portion 112*b* of the anchor loop 124 may be anchored (for example, via stitching, welding, adhesive, or the like) to the sheet 102 within the pocket 106. As illustrated in FIGS. 5B and 5C, the loop 111 has an overall exposed length $L_{e1}$, as in the length of the loop positioned outside of the pocket 106, when positioned in the extended position. However, upon sliding of the adjustment webbing 120 in the x-direction of the depicted coordinate axes, as illustrated in FIG. 5C, the exposed length $L_{e2}$ decreases because a portion of the loop 111 anchored to the adjustment webbing 120, slides with the adjustment webbing 120 and is pulled into the pocket 106. For example, in the depicted embodiment, the second portion 112*b* of the loop 111 doubles over on itself within the pocket 106 as the adjustment webbing 120 moves a distance, x, thereby causing the exposed length $L_{e1}$ to decrease to $L_{e2}$, which is characterized by the equation below:

$$L_{e2} \approx L_{e1} - 2x$$

where $L_{e1}$ is the exposed length when the loop 111 is in the extended position and x is the distance the second portion 112*b* is pulled into the pocket 106. However, in other embodiments, such as where a portion of the loop 111 is fixed to the anchor loop 124 via stitching or adhesive that change in length from the extended position to the retracted position may be equal to the distance the adjustment webbing 120 is moved within the pocket.

In any of the embodiments described herein, the adjustment webbing 120, and/or the handle(s) 122, may be formed of any material and may be formed of the same or a different material from the plurality of loops 110 and/or the sheet 102. For example, the adjustment webbing 120 may be formed of any material or combination of materials including natural and/or synthetic fibers woven and/or bonded into a sheet of material. In some embodiments, the material may be subject to disinfection and/or sterilization treatments, accordingly, the material may be resistant to breakdown which may otherwise be cause by disinfection and/or sterilization treatments. In some embodiments, the material may have or may be treated to have anti-microbial characteristics. In some embodiments, the adjustment webbing 120 and/or the handle(s) 122 may be constructed of a material that has load bearing properties allowing adjustment webbing 120 and/or handles(s) 122 to support the weight of a human subject. In some embodiments, the adjustment webbing 120 and/or handles 122 may be formed from a textile comprising natural fibers that are derived from animal (protein), vegetable (cellulose), and/or mineral sources. Illustrative examples of natural fibers include, but are not limited to, cellulose (staple) fibers such as bast, leaf, seed hair, cane, grass, and reed; protein (staple) fibers such as hair, wool, and/or filaments (e.g., secretions such as silk); and mineral fibers such as asbestos, glass, gold, silver, and/or the like. In some embodiments, the adjustment webbing 120 and/or the handle(s) 122 may be formed from one or more manufactured fibers such as manmade (humanmade), regenerated, or synthetic fibers having a chemical composition that is organic or inorganic or derivatives thereof. In some embodiments the adjustment webbing 120 and/or the handle(s) 122 may be formed from one or more fibers having a chemical composition that is organic or inorganic. Illustrative examples of organic polymer fibers from natural sources include, but are not limited to, acetate, alginate, cupro, elastodiene, lyocell, model, triacetate, and viscose. Illustrative examples of organic fibers made from synthetic polymers include, but are not limited to, acrylic, aramid, chlorofibre, elastane, elastodiene, elastoelfin, elastomultiester, flurofiber, melamine, modacrylic, polyamide, polyester, polyethelene, polyimide, polylactic acid, polypropylene, polypropylene/polyamide biocomponent, and vinylal. Illustrative examples of inorganic fibers include, but are not limited to, carbon, ceramic, glass, and metal. In some embodiments, coatings, such as antimicrobial coatings, may be applied to the adjustment webbing 120 and/or handle(s) 122.

Figure 6:
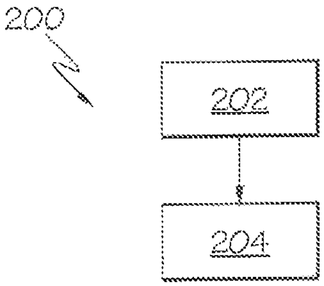
FIG. 6 depicts a method of adjusting a sheet assembly, according to one or more embodiments shown and described herein.

In any of the provided embodiments, because at least a portion of each loop 111 is anchored to the adjustment webbing 120, movement of the adjustment webbing 120 causes the plurality loops 110 (for example, the first plurality of loops 110*a* or the second plurality of loops 110*b*) to retract into the pocket 106*a*, 106*b*, thereby reducing an exposed length of the plurality of loops 110. FIG. 6 depicts a flow chart illustrating a method 200 adjusting a sheet assembly as described herein. The method 200 may include a greater or fewer number of steps, taken in any order, without departing from the scope of the present disclosure. The method may include, at step 202, pulling the first adjustment webbing, the adjustment webbing, or a combination thereof. For example, with reference to FIGS. 2A and 2B, the first adjustment webbing 120*a* and/or the second adjustment webbing 120*b* may be pulled, for example, via a handle 122 in the +/−x-direction of the depicted coordinate axes. Accordingly, the first adjustment webbing 120*a* and/or the second adjustment webbing 120*b* may be configured to slide into and/or out of the first pocket 106*a* or the second pocket 106*b* through the first pocket opening 108*a* and/or the second pocket opening 108*b*. The first adjustment webbing 120*a* and the second adjustment webbing 120*b* may be moved independent of one another, which may allow, for example, the first plurality of loops 110*a* to remain in an extended position while the second plurality the loops 110*b* (or vice versa) are moved to the retracted position, such as illustrated in FIG. 2B. This may be particularly beneficial when adjusting a subject 10 to lay on their side, where only a plurality of loops arranged along one side of the sheet 102 are used to reposition the subject 10. As noted herein above, in some embodiments there may be one or more middle pocket openings (e.g., a first middle pocket opening 128*a* and/or a second middle pocket opening 128*b* arranged along an edge of the sheet 102, such that the adjustment webbing 120*a*, 120*b* may be adjusted via pulling (e.g., in the +/−y direction of the depicted coordinate axes) the adjustment webbing through one or more middle pocket openings.

Referring to FIG. 2D and/or 5C, upon movement of the adjustment webbing 120*a*, 120*b*, the second portion 112*b* of the loop 111 is pulled along with the adjustment webbing 120. As the adjustment webbing 120*a* and/or 120*b* is pulled (e.g., by a user along the +/−X direction of the depicted coordinate axes), the adjustment webbing 120*a*, 120*b* slides within the first pocket 106*a* and/or the second pocket 106*b*, such that the plurality of loops 110 attached to the adjustment webbing 120*a* or 120*b* are pulled into the pocket 106*b*, thereby shortening an exposed length of the loops 111 (in the +/−Y direction of the depicted coordinate axes of FIGS. 2D and/or 5C).

Referring again to FIG. 6, the method 200 may include, at step 204, pulling one or more of the loops of the plurality of loops 110 to return the loop 111 to its extended position, such as illustrated in FIGS. 2A and 2C. For example, a user may simply pull on a loop 111 (e.g., in the +/−y direction of the depicted axes of FIGS. 2A-2D) to return the loop 111 its extended position. For example, pulling the loop 111 may cause the adjustment webbing 120*a*, 120*b* to slide within the pocket 106*a*, 106*b* to allow the loop 111 to return to its extended position.

In some embodiments, the sheet assembly 100 may be provided in a kit. In such embodiments, the kit may include instructions detailing the method 200 of use. For example, in some embodiments, the instructions may be provided on the sheet 102 of the sheet assembly 100. For example, text and/or graphics may be provided on the sheet 102 (e.g., printed, embroidered, or the like). For example, FIGS. 2A and 2B illustrate directional arrows 130 indicating directions for pulling adjustment webbing 120*a*, 120*b* to move the first plurality of straps 110*a* and/or the second plurality of straps 110*b* to the retracted position. In some embodiments, instructions may be provided via a tag affixed to the sheet assembly 100. In some embodiments, instructional markers may instead be provided on the adjustment webbing 120*a*, 120*b*, handle(s) 122, the plurality of loops 110, etc.

Figure 7:
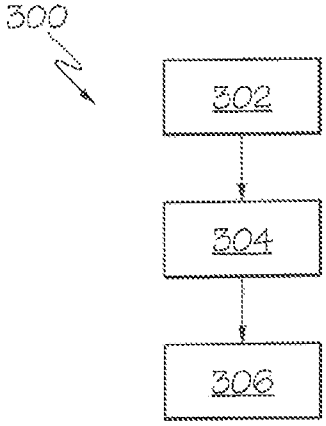
FIG. 7 depicts a method of assembling a sheet assembly, according to one or more embodiments shown and described herein.

FIG. 7 depicts a method 300 of assembling a sheet assembly 100 according to one or more embodiments. The method 300 may include a greater or fewer number of steps, performed in any order without departing from the scope of the present disclosure. For example, at step 302, the method 300 may include forming one or more pockets with in the sheet. For example, a first pocket 106*a* may be formed along the first edge 104*a* of the sheet 102 and a second pocket 106*b* may be formed along the second edge 104*b* of the sheet 102. As noted above, the one or more pockets may be formed by folding material of the sheet 102 along the edges and fixing the same in place, for example, via sewing welding, adhesion, or the like. In other embodiments, material may be added, for example, via sewing, welding adhesion, or the like to form the pocket.

At step 304, the method 300 includes coupling the plurality of loops 110 to the sheet 102 within the pocket 106. For example, a first plurality of loops 110*a* may be coupled to the sheet 102 within the first pocket 106*a* and a second plurality of loops 110*b* may be coupled to the sheet 102 within the second pocket 106*b*. Each loop of the plurality of loops 110 may be formed via separate straps or via a continuous strap affixed to the sheet 102 between each loop as described above.

At step 306, the method 300 may include anchoring a portion of each loop 111 to an adjustment webbing 120 such as via sewing, welding, adhesives, or the like. In some embodiments, each loop 111 may be anchored to the adjustment webbing 120 by an anchor loop 124, such as described above. For example, a portion of each loop 111 may be positioned within an opening 125 defined by each anchor loop 124. As described herein, the first plurality of loops 110*a* may be anchored to the first adjustment webbing 120*a* and the second plurality of loops 110*b* may be anchored to the second adjustment webbing 120*b*.

It should now be understood that embodiments of the present disclosure are directed to sheet assemblies that include a sheet and a plurality of loops coupled to the sheet that are moveable between an extended position and a retracted position. For example, a sheet assembly includes a sheet that includes a pocket extending longitudinally along an edge of the sheet. A plurality of loops are arranged along the edge and extend from the pocket of the sheet. An adjustment webbing is slidably positioned within the pocket. A least a portion of each loop of the plurality of loops is anchored to the adjustment webbing and sliding of the adjustment webbing along the pocket reduces an exposed length of the plurality of loops. Accordingly, the plurality of loops may be retracted into the pocket of the sheet, thereby shortening an exposed length of the plurality of loops. This may prevent the loops from becoming a trip hazard or becoming entangled with people or objects surrounding a subject support surface.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of adjusting a sheet assembly, the method comprising providing a sheet assembly comprising a sheet comprising an edge and a pocket extending longitudinally along the edge, a plurality of loops arranged along the edge and extending from openings formed in the pocket of the sheet, and an adjustment webbing slidably positioned within the pocket, wherein at least a portion of each loop of the plurality of loops is anchored to the adjustment webbing such that sliding the adjustment webbing along the pocket pulls the plurality of loops into the pocket and reduces an exposed length of the plurality of loops; and pulling the adjustment webbing along the pocket, thereby causing the plurality of loops to move from an extended position to a retracted position.

2. The method of claim 1, further comprising pulling on a loop of the plurality of loops, thereby causing the loop of the plurality of loops to move from the retracted position to the extended position.

3. The method of claim 1, wherein pulling on the adjustment webbing, comprises pulling a handle coupled to the adjustment webbing.

4. The method of claim 1, wherein the pocket opening is formed at a position between a first end of the pocket and a second end of the pocket opposite the first end.

5. The method of claim 1, wherein the pocket opening is formed at one of a first end and a second end of the pocket.

6. The method of claim 1, wherein the plurality of loops are formed via a continuous strap at least partially disposed within the pocket, the strap arranged such that portions of the strap extend through the openings to define the plurality of loops.

7. The method of claim 1, wherein the plurality of loops are formed via a plurality of straps coupled to the sheet within the pocket.

8. A method of assembling, the method comprising:

forming a continuous pocket along an edge of a sheet;

coupling a plurality of loops to the sheet within the continuous pocket; and anchoring a portion of each of the loops to an adjustment webbing.

9. The method of claim 8, wherein coupling the plurality of loops to the sheet within the continuous pocket comprises arranging the plurality of loops along the edge and extending the plurality of loops from openings formed in the continuous pocket of the sheet.

10. The method of claim 8, further comprising positioning the adjustment webbing within the continuous pocket.

11. The method of claim 8, further comprising forming the plurality of loops with a continuous strap.

12. The method of claim 11, wherein anchoring the portion of each of the loops to the adjustment webbing comprises passing each loop through an opening of the adjustment webbing.

13. The method of claim 8, further comprising forming the plurality of loops from a plurality of straps.

14. The method of claim 13, wherein anchoring the portion of each of the loops to the adjustment webbing comprises passing each loop through an opening of the adjustment webbing.

15. The method of claim 8, wherein coupling the plurality of loops to the sheet within the continuous pocket comprises coupling each loop to the sheet within the continuous pocket at a first location and a second location.

16. The method of claim 8, further comprising:

forming a second pocket along a second edge of the sheet;

coupling a second plurality of loops to the sheet within the second pocket; and anchoring a portion of the each loop of the second plurality of loops to a second adjustment webbing.

17. The method of claim 16, wherein anchoring the portion of each of the loops of the second plurality of loops to the second adjustment webbing comprises passing each loop through an opening of the second adjustment webbing.

18. A method of adjusting a sheet assembly, the method comprising:

providing a sheet assembly comprising:

a sheet comprising a first edge;

a second edge opposite the first edge;

a subject support portion spanning between the first edge and the second edge;

a first pocket extending longitudinally along the first edge; and a second pocket extending longitudinally along the second edge, a first plurality of loops arranged along the first edge and extending from the first pocket of the sheet;

a first adjustment webbing slidably positioned within the first pocket, wherein at least a portion of each loop of the first plurality of loops is anchored to the first adjustment webbing such that sliding the first adjustment webbing along the first pocket pulls the first plurality of loops into the first pocket and reduces an exposed length of the first plurality of loops;

a second plurality of loops arranged along the second edge and extending from the second pocket of the sheet; and a second adjustment webbing slidably positioned within the second pocket, wherein at least a portion of each loop of the second plurality of loops is anchored to the second adjustment webbing such that sliding the second adjustment webbing along the second pocket pulls the second plurality of loops into the second pocket and reduces the exposed length of the second plurality of loops; and pulling at least one of the first adjustment webbing and the second adjustment webbing, thereby causing at least one of the first plurality of loops and the second plurality of loops to move from an extended position to a retracted position.

19. The method of claim 18, further comprising pulling on a loop of one of the first plurality of loops and the second plurality of loops, thereby causing the loop of the first plurality of loops or the second plurality of loops to move from the retracted position to the extended position.

20. The method of claim 18, wherein pulling on the at least one of the first adjustment webbing and the second adjustment webbing, comprises pulling a handle coupled to one of the first adjustment webbing and the second adjustment webbing.

* * * * *